(12) United States Patent
Krivitski et al.

(10) Patent No.: US 8,897,314 B1
(45) Date of Patent: *Nov. 25, 2014

(54) METHOD AND APPARATUS FOR POWER REDUCTION IN NETWORK

(71) Applicant: Marvell Israel (M.I.S.L) Ltd., Yokneam (IL)

(72) Inventors: Denis Krivitski, Nazareth Illit (IL); Youval Nachum, Shoham (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,332

(22) Filed: Dec. 18, 2012

Related U.S. Application Data

(63) Continuation of application No. 12/410,879, filed on Mar. 25, 2009, now Pat. No. 8,340,111.

(60) Provisional application No. 61/039,581, filed on Mar. 26, 2008.

(51) Int. Cl.
*H04L 12/28* (2006.01)
*H04L 12/26* (2006.01)
*H04B 3/00* (2006.01)
*H04L 12/00* (2006.01)

(52) U.S. Cl.
CPC . *H04L 43/10* (2013.01); *H04B 3/00* (2013.01); *H04L 12/00* (2013.01)
USPC ........... 370/419; 370/237; 370/252; 370/254; 713/300; 375/295

(58) Field of Classification Search
CPC ................................ H04L 12/28; H04L 12/56
USPC .......................................................... 370/419
See application file for complete search history.

(56) References Cited

U.S. PATENT DOCUMENTS

| | | | |
|---|---|---|---|
| 6,845,131 B1 * | 1/2005 | Ward et al. | 375/295 |
| 8,340,111 B1 * | 12/2012 | Krivitski et al. | 370/419 |
| 2003/0204756 A1 * | 10/2003 | Ransom et al. | 713/300 |
| 2004/0065837 A1 | 4/2004 | Schick et al. | |
| 2004/0202111 A1 | 10/2004 | Beshai et al. | |
| 2006/0164979 A1 * | 7/2006 | Pirbhai et al. | 370/229 |
| 2006/0282687 A1 * | 12/2006 | Bahali et al. | 713/300 |
| 2007/0183786 A1 | 8/2007 | Hinosugi et al. | |
| 2007/0201380 A1 | 8/2007 | Ma et al. | |
| 2008/0299907 A1 * | 12/2008 | Takayama | 455/41.2 |
| 2009/0003229 A1 * | 1/2009 | Loh et al. | 370/252 |

OTHER PUBLICATIONS

U.S. Appl. No. 12/391,562, Nachum et al., filed Feb. 24, 2009.

* cited by examiner

*Primary Examiner* — Ayaz Sheikh
*Assistant Examiner* — Hai-Chang Hsiung (57) ABSTRACT

Aspects of the disclosure can provide a network switch having reduced power consumption. The network switch can include a plurality of ports that are configured to receive and transmit network traffic. The plurality of ports can be configured in a power-on mode and a power-off mode. Further, at least a first port among the plurality of ports can be configured to remain in the power-on mode and to receive power control instructions. In addition, the network switch can include a power controller. The power controller can change the power modes of selected ports among the plurality of ports in response to the power control instructions received through the first port.

18 Claims, 5 Drawing Sheets

FIG. 5

METHOD AND APPARATUS FOR POWER REDUCTION IN NETWORK

INCORPORATION BY REFERENCE

This application is a continuation of U.S. patent application Ser. No. 12/410,879, filed on Mar. 25, 2009, which claims the benefit of U.S. Provisional Application No. 61/039,581, "Wake on LAN for Switch" filed on Mar. 26, 2008, the disclosures of which are incorporated herein by reference in their entireties.

BACKGROUND

Network devices may have significant power consumption requirement. For numerous reasons, it is typically desirable to reduce the power consumption of the network devices.

SUMMARY

Aspects of the disclosure can provide a network switch having reduced power consumption. The network switch can include a plurality of ports that are configured to receive and transmit network traffic. The plurality of ports can be configured in a power-on mode and a power-off mode. Further, at least a first port among the plurality of ports can be configured to remain in the power-on mode and to receive power control instructions. In addition, the network switch can include a power controller. The power controller can change the power modes of selected ports among the plurality of ports in response to the power control instructions received through the first port. The power control instructions may be received from another switch in the network.

According to an embodiment of the disclosure, the power controller can change a power mode of a selected port from the power-on mode to the power-off mode when there is no network traffic to the selected port, and to change the power mode of the selected port from the power-off mode to the power-on mode in response to a power-on instruction.

Alternatively, the power controller can change a power mode of a selected port from the power-on mode to the power-off mode in response to a power-off instruction, and to change the power mode of the selected port from the power-off mode to the power-on mode in response to a power-on instruction.

According to an aspect of the disclosure, the power control instructions can be included in packets directed to the network switch.

In an embodiment, the first port is a port communicating with other switches in a network. For example, the first port is assigned as a member of a management virtual local area network (VLAN).

In another embodiment, the network switch can be an edge switch in a network. The first port can communicate with another switch in the network, and at least another port of the network switch is configured to communicate with a terminal device.

According to an aspect of the disclosure, the network switch can monitor traffic, and transmit traffic information in response to a traffic polling request.

Aspects of the disclosure can provide a method for reducing power consumption in a network switch. The method can include selectively powering down at least a first port in the network switch, maintaining at least a second port in the network switch in a power-on mode; and switching the first port into a power-on mode in response to a power-on instruction received from another network switch through the second port.

To selectively power down the first port, the method can include powering down the first port in response to detecting an absence of network traffic through the first port.

Alternatively, the method can include powering down the first port in response to a power-off instruction received from another network switch.

According to an aspect of the disclosure, the power-off instruction and the power-on instruction can be transmitted in packets.

To maintain the second port in the network switch in the power-on mode, the method can include maintaining a port that is coupled to another switch in the network in the power-on mode.

When a switch is placed in a power-off mode, the entire switch may be powered down, or alternatively only the transmitting or receiving portions of the switch may be selectively placed in the power-off mode.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
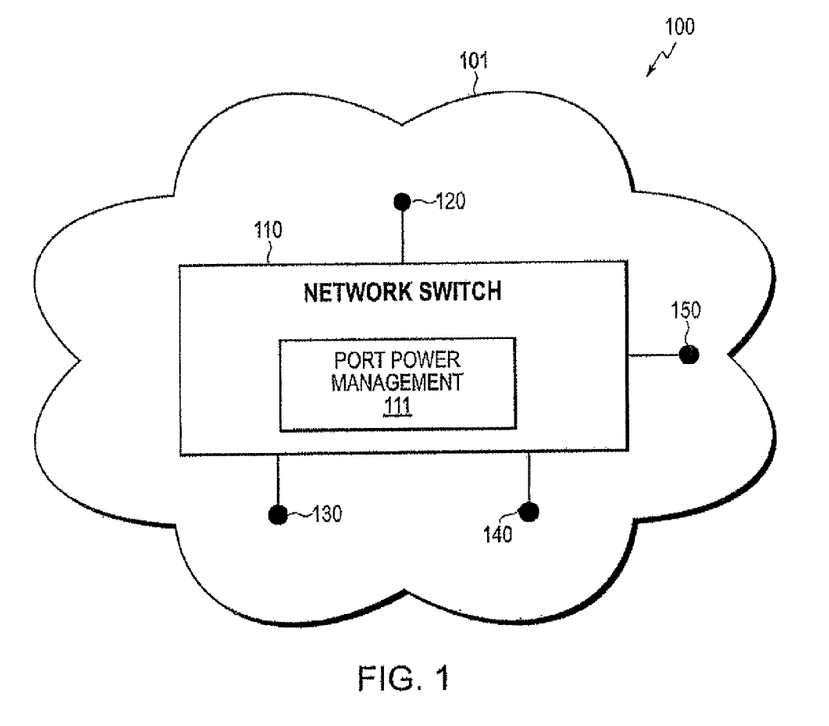
FIG. 1 shows a simplified block diagram of a network configured in accordance with an embodiment of the disclosure.

FIG. 1 shows a simplified block diagram of a network in accordance with an embodiment of the present disclosure. The network 101 may include a network switch 110. The network switch 110 can include a plurality of ports that can couple a plurality of network nodes 120-150. The plurality of network nodes 120-150 may couple to ports of other switches or to terminal devices. The plurality of network nodes 120-150 can direct network traffic to the network switch 110 for switching, and the network switch 110 can receive network traffic from the plurality of ports, and redirect the network traffic to destinations. According to the disclosure, the network switch 110 can include a port power management block 111 that can selectively power up and power down one or more of the ports in the network switch 110. In other words, the network switch 110, at least the plurality of ports, can thus have controllable power modes. The power modes of different ports can be controlled, for instance, in response to instructions, which may be included in packets, received from another switch in the network 101, or in response to network traffic at the ports.

The network 101 can include any suitable sub-networks, such as physically connected local area network (LAN), virtual LAN (VLAN), and the like. The sub-networks may include wired and wireless couplings. Further, the network 101 may operate under various suitable protocols to provide communication services. In addition, the network 101 may include any devices that may be involved in communication via the network 101, such as network switches, hubs, routers, access points, terminal devices, servers, and the like.

The network switch 110 can be coupled to various devices in the network 101, such as terminal devices, routers, other network switches, and the like, via the plurality of ports. The various devices may direct network traffic to the ports of the network switch 110 for switching, and may receive the switched network traffic from the ports of the network switch 110. The network traffic to the network switch 110 for switching may vary from time to time. At certain times, there can be no network traffic to the network switch 110 for switching. Further, the network traffic to network switch 110 may vary from one port to another port. At certain times, a port may have no traffic.

According to the disclosure, the network switch 110 can power off selected ports to reduce power consumption when the selected ports have no traffic. The port traffic can be detected by various techniques. In an embodiment, the network switch 110 may include a traffic sensor at each of the ports to monitor the port traffic. In another embodiment, the network switch 110 may monitor ingress rates or en-queue rates of the ports. In another embodiment, the no-traffic status may be detected by other devices. For example, the no-traffic status may be detected by a central control device. The central control device may be able to detect whether the various devices coupled to the ports of the network switch 110 are in operation. When a device is not in operation, a port in the network switch 110, which is coupled to the device, can be considered as having no traffic.

According to an aspect of the disclosure, the network switch 110 itself, can make the determination to power off selected ports. Alternatively, a device coupled to the network switch 110 can make the determination to power off selected ports of the network switch 110. In an embodiment, the network switch 110 can detect the no-traffic status for selected ports, and can determine to power off the selected ports. In another embodiment, another device may poll information, such as network traffic information, from the network switch 110, and may detect the no-traffic status for selected ports, and may determine to power off the selected ports. In another embodiment, another device may detect the no-traffic status of selected ports by techniques other than polling information from the network switch 110, and can also determine to power off the selected ports. Then, the other device may transmit an instruction, which can be sent in a packet, to the network switch 110 to power off the selected ports of the network switch 110.

In an example, the network 101 may include a control node (not shown) coupled to a port, such as a port that is assigned as a member of a management VLAN, of the network switch 110. The control node may be able to obtain network information from various sources, such as network switches, entrance control system, network architecture, scheduler, servers, and the like. Further, the control node can send instructions to the port of the network switch 110 based on the network information.

According to the disclosure, at least a portion of the network switch 110, such as the ports in the network switch 110, can be selectively configured in a power-off mode. Such ports, may include, for example, ports that are coupled to terminal devices. In addition, the network switch 110 may include one or more ports, such as ports that are coupled to other switches, that may remain in the power-on mode, even though other ports in the network switches 110 are in the power-off mode. In accordance with an embodiment, the ports that are kept in the power-on mode may be members of a management VLAN. The ports in the power-on mode can receive instructions, such as a power-on instruction, in a packet directed to the network switch 110. Then, the other ports that are in the power-off mode can be configured in the power-on mode in response to the power-on instruction. It is noted that the network switch 110 may use other suitable techniques to determine to power on those ports. For example, the network switch 110 may determine to power on those ports based on a time duration that those ports have been powered off.

Figure 2:
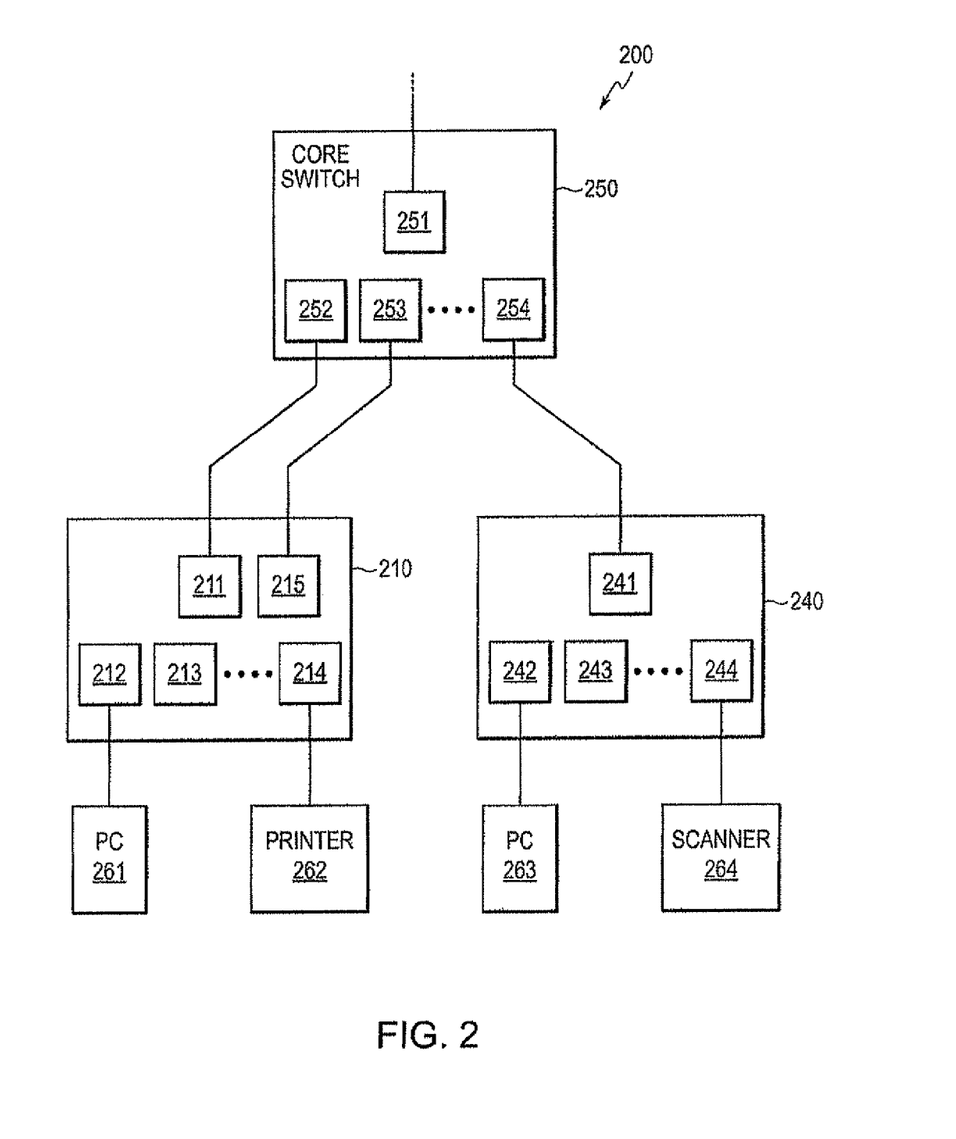
FIG. 2 shows a more detailed block diagram of a local area network (LAN) configured in accordance with an embodiment of the disclosure.

FIG. 2 shows a block diagram of a local area network (LAN) example 200 configured according to an embodiment of the disclosure. The LAN 200 may include a plurality of network switches, such as a core switch 250, edge switches 210 and 240, and a plurality of terminal devices 261-264. These elements can be coupled together as shown in FIG. 2.

The core switch 250 may include a plurality of ports 251-254 coupled to various devices, such as terminal devices, servers, edge switches, and the like. In the FIG. 2 example, the ports 252 and 253 can be coupled to the edge switch 210, and the port 254 can be coupled to the edge switch 240. It is noted that the core switch 250 may be coupled to routers (not shown) to access, for example, other LANs, Internet, and the like. Further, the core switch 250 may be coupled to servers (not shown) to, for example, monitor, backup and update, the LAN 200. In addition, the core switch 250 may be coupled to other devices or systems, such as an entrance control system, and the like.

In an embodiment, the core switch 250 may include a power control unit (not shown). The power control unit can make determinations whether to power off or power on, for example, selected ports of the edge switches 210 and 240, and may generate and send instructions to the edge switches 210 and 240. In an example, the power control unit can make the determination based on network traffic information, such as ports activity indications, from the edge switches 210 and 240. The power control unit may generate and send instructions to the edge switches 210 and 240 to poll the network traffic information at the edge switches 210 and 240. Then, the power control unit can make the determinations based on the polled traffic information, and send instructions to power off, for example, selected ports of the edge switches 210 and 240. In another example, the power control unit can make a determination that network traffic will be directed to a port that currently is in power-off mode, and then send a suitable instruction to that port, or to the switch in which the port resides, to enter a power on mode in advance of receiving forthcoming network traffic.

In another example, the power control unit can make the determinations based on network information from sources other than the edge switches 210 and 240. For example, the power control unit may receive information from a power monitor system coupled to power supply of the terminal devices in the LAN 200. In another example, the power control unit may receive information from the servers that are in charge of maintenance activities in the LAN 200. Then, the power control unit may determine to power off, for example, selected ports of the edge switches 210 and 240, when the terminal devices are powered off and there is no maintenance activities in the LAN 200. Thus, the power controller unit may generate and send a power-off instruction to the edge switches 210 and 240.

The edge switches 210 and 240 can also include a plurality of ports. One or more ports can be coupled to the core switch 250 to communicate with the core switch 250. In the example of FIG. 2, the edge switch 210 may have ports 211 and 215 coupled to the core switch 250, and the edge switch 240 can have a port 241 coupled to the core switch 250. The ports 211 and 241 can receive network traffic, such as packets, from the core switch 250, and can direct packets to the core switch 250. In an embodiment, the ports 211 and 241 can receive instructions, such as polling instruction, power-on instruction, power-off instruction, and the like, from the core switch 250, and may transmit information, such as traffic information, activity status information, and the like, to the core switch 250.

In another embodiment, an edge switch may include a port, such as port 215, coupled to the core switch 250. The port 215 of the edge switch 210 may be assigned as a management port. In an example, the port 215 can be a member of a management virtual LAN (VLAN). The port 215 can receive power instructions from the core switch 250.

The plurality of ports of the edge switches 210 and 240 can have controllable power modes. For example, each of the plurality of ports can be selectively powered on or powered off. In an embodiment, a port may include a receiving portion and a transmitting portion. The receiving portion and the transmitting portion can be selectively powered on or powered off. For example, a port can be configured in a passive receiving mode. In the passive receiving mode, the transmitting portion of the port can be powered off, and the receiving portion of the port can receive packets.

In an example, the port 215 can be configured to stay in the power-on mode or the passive receiving mode, when other ports can be configured in the power-off mode. Thus, the port 215 can keep receiving instructions from the core switch 250 even though other ports are in the power-off mode.

Additionally, the edge switches 210 and 240 may couple the various terminal devices 261-264 into the LAN 200. In the FIG. 2 example, the edge switch 210 can include a port 212 coupled to a personal computer (PC) 261, and a port 214 coupled to a printer 262; and the edge switch 240 can include a port 242 coupled to a PC 263, and a port 244 coupled to a scanner 264. The various terminal devices 261-264 may communicate within the LAN 200, and may communicate with other network nodes outside of the LAN 200 when the core switch 250 is coupled to the other network nodes.

According to an embodiment of the disclosure, the ports of the edge switches 210 and 240 can be selectively configured into suitable power modes according to the activity status of the ports. The activity status can be determined by the edge switches 210 and 240 themselves, or can be determined by devices other than the edge switches 210 and 240. In an example, port activities of a switch may be monitored according to a time window. When a port does not have any activities in the time window, the port is considered as in a no-activity status. In another example, a port can be considered as in the no-activity status if traffic load is lower than a threshold. It is noted that when a port is in the no-activity status, there may exist low traffic load, such as "keep alive" messages sent by a coupled terminal device, to the port. Thus, the time window, or the threshold can be suitably adjusted to either take a type of traffic into account or not take a type of traffic into account.

In another example, the no-activity status can be determined by devices other than the edge switches 210 and 240. For example, the LAN 200 may be a portion of a company network. The company network may be managed by a control system. The control system may determine the activity status of the edge switches 210 and 240. For example, the company may have operation hours between 8:00 am to 6:00 pm, and may have scheduled system backups and updates from 12:00 am to 1:00 am. Thus, the control system may determined that the LAN 200 may be in a no-activity status at certain time durations, such as a first time duration from 6:00 pm to 12:00 am, and a second time duration from 1:00 am to 8:00 am.

According to an aspect of the disclosure, edge switches 210 and 240 themselves, can make the determinations to reconfigure the ports power modes. For example, the edge switch 210 may monitor activities of its ports. When a port does not have any activity in a time window, the port can be reconfigured to a power mode that may have reduced power consumption. In an example, the whole port can be powered off. In another example, a transmitting portion of the port can be powered off, while a receiving portion of the port can stay powered on. The receiving portion of the port may passively receive messages.

In another embodiment, the ports of edge switches 210 and 240 can be selectively reconfigured into a power mode in response to instructions from other devices, such as the core switch 250. For example, the core switch 250 may receive network information regarding the edge switches 210 and 240, and detect that selected ports of the edge switches 210 and 240 are in no-activity status and may keep the no-activity status in the near future. Thus, the core switch 250 may send a power-off instruction to the edge switches 210 and 240 respectively, to reconfigure the selected ports of the edge switches 210 and 240. Accordingly, the selected ports of the edge switches 210 and 240 may be reconfigured into a power mode with reduced power consumption. For example, the edge switches 210 and 240 may power off ports that communicate with terminal devices, such as the ports 212-214 and ports 242-244.

According to an aspect of the disclosure, when a port is configured in a power off mode, at least the transmitting portion of the port is powered off. The port may or may not power off the receiving portion of the port. In an embodiment, the edge switches 210 and 240 may keep at least the receiving portion of a core port, such as ports 211, 215 and 241 that are coupled to the core switch 250, powered on to receive messages from the core switch 250. In another embodiment, an edge switch may keep at least one whole core port powered on. In the FIG. 2 example, the port 215 of the edge switch 210 may be assigned as a member of a management VLAN and may stay powered on at all time, and the core port 211 can be powered off. For the edge switch 240, the core port 241 may stay powered on to receive messages from the core switch 250.

The core switch 250 may send a power-on instruction to the edge switches 210 and 240, when network traffic to selected ports of the edge switches 210 and 240 is expected. Then, the edge switches 210 and 240 may reconfigure the selected ports into the power-on mode in response to the power-on instruction. In the FIG. 2 example, the edge switches 210 and 240 may power on ports that communicate with terminal devices, such as the ports 212-214 and the ports 242-244, in response to the power-on instruction. Additionally, the edge switch 210 may power on the core port 211 if the core port 211 is configured in the power-off mode.

It is noted that the selected ports of the edge switch 210 may be powered on in response to signals within the edge switch 210. For example, the edge switch 210 may include a timer, and may determine to power on the ports 211-214 according to the timer.

During operation, for example, ports of the edge switches 210 and 240 may be powered on to provide switching services in the LAN 200, initially. Further, network traffic to the ports of the edge switches 210 and 240 may be monitored, either directly by the edge switches 210 and 240, or indirectly by devices (not shown) coupled to the LAN 200. At a time, a no-activity status may be detected for a number of ports, either by the edge switches 210 and 240 themselves, or by other devices, such as the core switch 250. The number of ports can be selected. Further, the edge switches 210 and 240, at least selected ports of the edge switches 210 and 240, may be respectively configured in the power-off mode, either in response to determinations by the edge switches 210 and 240 themselves, or in response to instructions from the other devices, such as the core switch 250. It is noted that the edge switches 210 and 240 may include one or more ports, such as the port 215, the port 241, and the like, that can stay in the power-on mode, when other ports are configured in the power-off mode.

Further, the selected ports of the edge switches 210 and 240, may be powered on to provide switching services to coming traffic. In an embodiment, the edge switches 210 and 240 may be powered on in response to signals within themselves, for example, a timer signal. In another embodiment, the edge switches 210 and 240 may be powered on in response to an instruction from other devices, such as the core switch 250.

Figure 3:
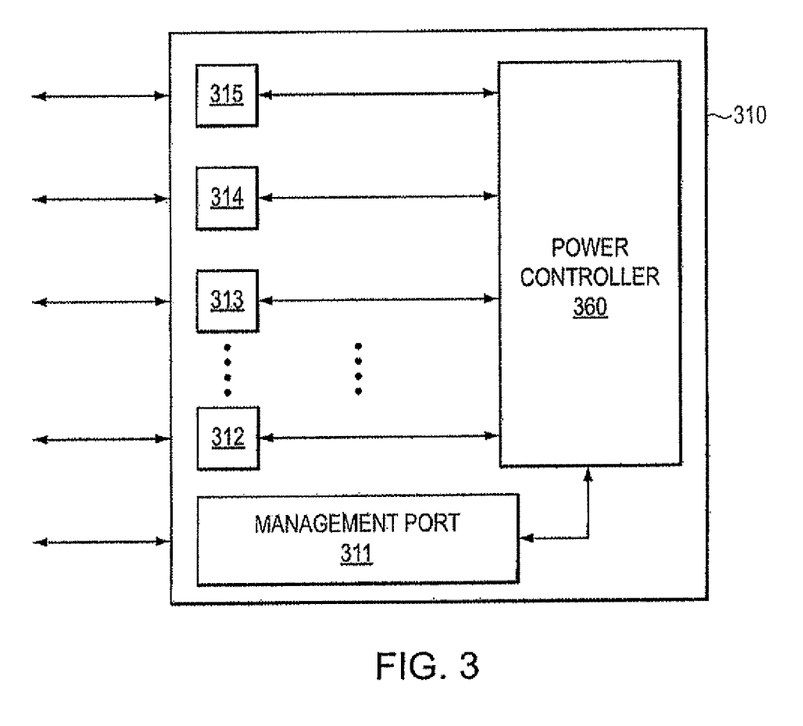
FIG. 3 shows a block diagram of a network switch in the network of FIG. 1.

FIG. 3 shows a block diagram of a network switch example 310 according to the disclosure. The network switch 310 may include a plurality of ports 311-315 that can be power configurable, in other words can be configured in a power-on mode or a power-off mode. Further, the network switch 310 can include a power controller unit 360 that can configure the power modes of the ports 311-315. In addition, at least one of the plurality of ports 311-315, for example, the port 311, can be configured to receive instructions for power control. These elements can be coupled together as shown in FIG. 3.

The power controller 360 may monitor network traffic through the ports 311-315. For example, the power controller 360 may monitor traffic sensors in the ports 311-315. In an example, the power controller 360 may calculate a traffic load, such as an ingress rate or an en-queue rate for each of the ports 311-315, and may compare the traffic load to a threshold. When the traffic load of a port is smaller than the threshold, the port can be considered as in a no-activity status. In another embodiment, the power controller 360 may monitor the activities of a port for a time window, and determine the activity status based on whether the port has any activity within the time window. Then, the power controller 360 may determine whether to configure the ports 311-315 into the power-off mode. In an example, the power controller 360 may determine whether the no-activity status is expected in the near future for the ports 311-315. When the no-activity status is expected in the near future for a port, the power controller 360 may select the port and configure the port into the power-off mode. When traffic is still expected in the near future for a port, the port may stay in the power-on mode. It is noted that at least a transmitting portion of a port can be powered off when the port is configured in the power-off mode.

In another embodiment, the power controller 360 may send traffic information to other devices coupled to the network switch 310 for making the determination to power off selected ports of the network switch 310. More specifically, the power controller 360 may send the traffic information to the other devices, for example, when a network traffic polling request is received. The traffic information may include activity indications for each of the ports 311-315. The other devices may determine to power off, for example, selected ports of the network switch 310, and send an instruction, which may be included in a packet, to the network switch 310. In an embodiment, the other devices may make the determination at least partially based on the traffic information of the network switch 310. Other information that can be based on and may include, but not be limited to, traffic information of other network switches, network server schedules, entrance control information, power status of terminal devices, and the like. The instruction can be received by the power controller 360. Then, the power controller 360 can configure the selected ports of 311-315 to the power-off mode.

On the other hand, the power controller 360 can configure selected ports of 311-315 into the power-on mode. In an embodiment, the power controller 360 may include a timer to keep track of the time that the selected ports of 311-315 are in the power-off mode. After a time interval, the power controller 360 may configure the selected ports of 311-315 back to the power-on mode. In another embodiment, the power controller 360 may receive an instruction from other devices, such as another switch, to reconfigure the power mode of the selected ports.

In an example, the port 311 may be configured as a management port, such as a member of a management VLAN. The management port 311 may stay in the power-on mode, thus the management port 311 can transmit traffic information to, and receive instructions from, other devices that are coupled to the network switch 310 via the management port 311. For example, the other devices may send traffic polling requests to the network switch 310 via the management port 311. Further, the management port 311 may transmit network information to the other devices. When the other devices determine to configure selected ports of the network switch 310 into the power-off mode, the other devices can send power-off instructions, which can be included in packet, to the network switch 310 via the management port 311. When the other devices determine to power on the selected ports of the network switch 310, they can send power-on instructions, which can be included in a packet, to the network switch 310 via the management port 311.

It is noted that each of the ports 311-315 can include a receiving portion and a transmitting portion. When a port is configured in the power-off mode, at least the transmitting portion of the port is powered off. It is also noted that the management port 311 may be configured in such a way that at least the receiving portion of the port 311 can stay in the power-on mode for receiving power instructions from the other devices.

It is noted that the power controller 360 can be implemented as hardware, software, or a combination of hardware and software. For example, the power controller 360 may be implemented as instructions that can be stored in a memory medium. The instructions can be executed by a processor to perform the controlling functions of the power controller 360.

Figure 4:
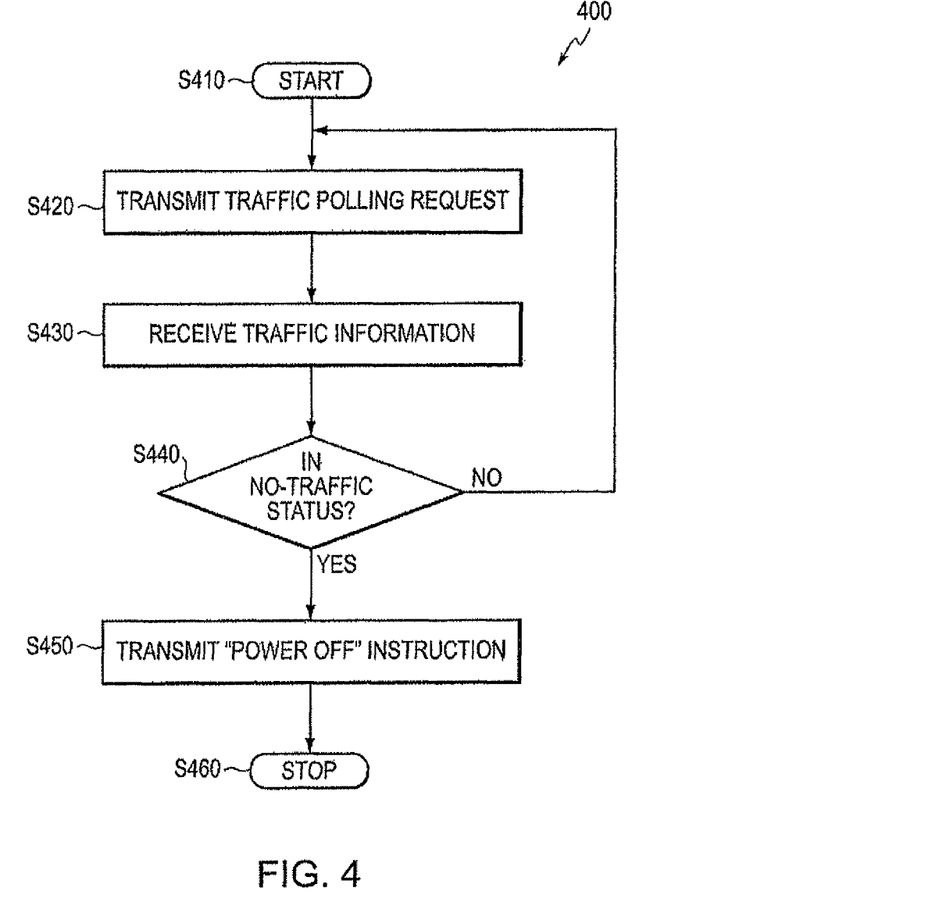
FIG. 4 shows a flow chart outlining a process example for reducing power consumption in a network switch in accordance with an embodiment of the disclosure.

FIG. 4 shows a flowchart outlining a process example 400 for reconfiguring a network switch from a power-on mode to a power-off mode in accordance with an embodiment of the disclosure. The process starts at step S410, and proceeds to step S420.

In step S420, a control node, such as the core switch 250 in FIG. 2, may transmit a traffic polling request to the network switch. The network switch may provide monitored network traffic to the control node. The network traffic can be monitored by various techniques, such as calculating ingress rates or en-queue rates, monitoring power status of terminal devices, monitoring activities for each port of the network switch in a time window, and the like. The network traffic may include traffic loads or activity indications for each port of the network switch, or for the network switch as a whole. Then, the process proceeds to step S430.

In step S430, the control node can receive the network traffic information, for example, in a packet from the network switch to the control node. Then, the process proceeds to step S440.

In step S440, the control node may determine whether the network switch is in a no-traffic status. In an embodiment, the control node may consider the traffic status for the network switch as a whole. In another embodiment, the control node may consider the traffic status by port for the network switch. When the network switch has traffic, or selected ports of the network switch have traffic, the process returns to the step S420; otherwise, the process proceeds to step S450.

In step S450, the control node may transmit a power-off instruction, for example, in a packet, to the network switch. In an embodiment, the power-off instruction is transmitted to a port of the network switch that couples the control node with the network switch. The network switch may power off selected ports in response to the power-off instruction. More specifically, at least transmitting portions of the selected ports are powered off. The process then proceeds to step S460, and terminates.

Figure 5:
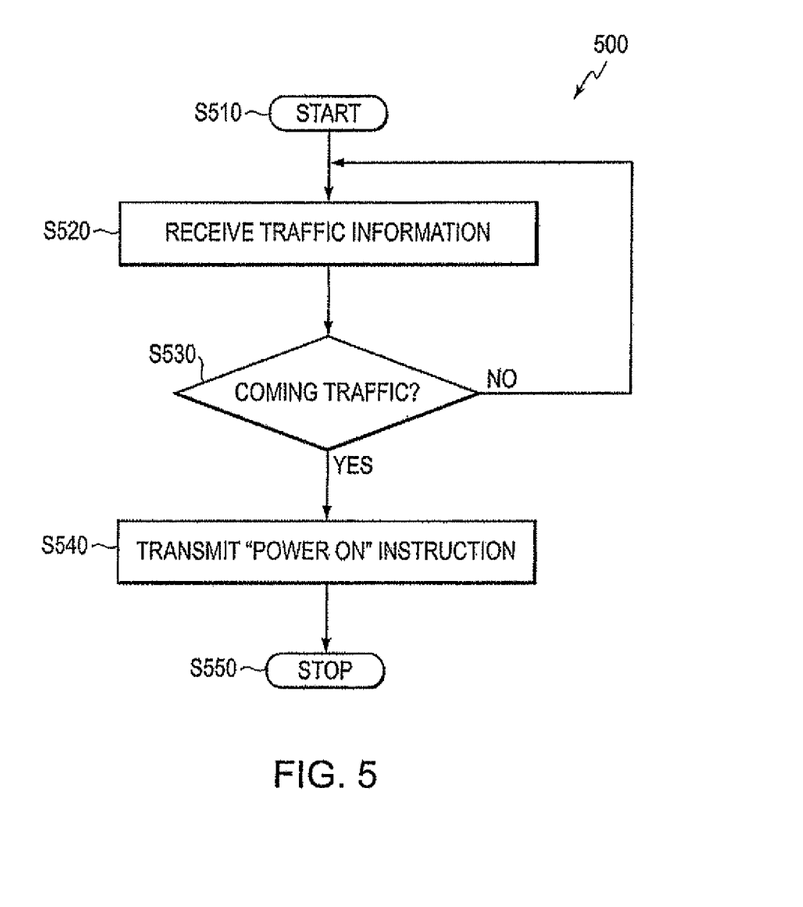
FIG. 5 shows a flow chart outlining a process example for reconfiguring a network switch in accordance with an embodiment of the disclosure.

FIG. 5 shows a flow chart outlining a process example 500 for reconfiguring a network switch from a power-off mode to a power-on mode according to an embodiment of the disclosure. The process starts at step S510, and proceeds to step S520.

In step S520, a control node, such as the core switch 250 in FIG. 2, can receive network traffic information for the network switch. The network traffic can be monitored by various techniques, such as monitoring passively received messages from ports of the network switch, monitoring power status of terminal devices coupled to the network switch, and the like. Then, the process proceeds to step S530.

In step S530, the control node may determine whether there exists coming traffic to the network switch. In an embodiment, the control node may consider the coming traffic for the network switch as a whole. In another embodiment, the control node may consider the coming traffic by port. When the coming traffic is not expected, the process returns to the step S520; otherwise, the process proceeds to step S540.

In step S540, the control node may transmit a power-on instruction, for example, in a packet, to the network switch. In an embodiment, the power-on instruction is transmitted to a port of the network switch that stays powered on at all time. In another embodiment, the power-on instruction is passively received by a port that the receiving portion of the port stays powered on. The network switch may power on selected ports in response to the power-on instruction. The process then proceeds to step S550, and terminates.

While the disclosure has been described in conjunction with the specific embodiments thereof that are proposed as examples, it is evident that many alternatives, modifications, and variations will be apparent to those skilled in the art. Accordingly, embodiments of the disclosure as set forth herein are intended to be illustrative, not limiting. There are changes that may be made without departing from the spirit and scope of the disclosure.

What is claimed is:

1. A network switch, comprising:
   a plurality of circuit portions configured to at least one of receive, switch and transmit network traffic, at least some circuit portions of the network switch being configurable in a power-on mode and a power-off mode and to communicate with a terminal device:
   a management port assigned as a member of a management network, the management port configured to:
      communicate with another switch in a network,
      receive traffic polling requests from other switches coupled to the network switch that is an edge switch via the management port of the management network, and to transmit traffic load indications to the management network in response to the traffic polling request when a transmitting portion of the management port is powered on, and
      receive instructions from the management network in a passive receiving mode when a receiving portion of the management port remains powered on and at least the transmitting portion remains powered off until the management port receives a power-on instruction from the management network; and
   a power controller configured to control at least one of the circuit portions that is in the power-off mode to enter the power-on mode in response to the power-on instruction received by the management port.

2. The network switch according to claim 1, wherein the power controller is configured to change a power mode of a selected circuit portion from the power-on mode to the power-off mode when there is no network traffic handled at the selected circuit portion, and to change the power mode of the selected circuit portion from the power-off mode to the power-on mode in response to the power-on instruction received by the management port.

3. The network switch according to claim 1, wherein the power controller is configured to change a power mode of a selected circuit portion from the power-on mode to the power-off mode in response to a power-off instruction received by the management port, and to change the power mode of the selected circuit portion from the power-off mode to the power-on mode in response to the power-on instruction received by the management port.

4. The network switch according to claim 1, wherein the power-on instruction is included in a packet directed to the management port of the network switch.

5. The network switch according to claim 1, wherein the management port is a port communicating with other switches in a network.

6. The network switch according to claim 1, wherein the management port receives traffic polling requests from the management network and transmits traffic load indications to the management network in response to the traffic polling request when the management port is in the power-on mode.

7. A method for reducing power consumption in a network switch, comprising:
   communicating with a terminal device at least one of circuit portions of the network switch that is an edge switch;
   transmitting traffic load indications for a plurality of the circuit portions by a management port to a management network in response to a traffic polling request from other switches coupled to the network switch via the management port of the management network when a transmitting portion of the management port is powered on, the management port being assigned as a member of the management network and configured to communicate with another switch in a network;
   powering down selected circuit portions in the network switch, the circuit portions being configured to at least one of receive, switch and transmit network traffic when in a power-on mode;
   maintaining the management port in a passive receiving mode in which a receiving portion of the management port remains powered on and the transmitting portion of the management port remains powered off; and
   switching at least one of the circuit portions into the power-on mode in response to a power-on instruction received from another network switch through the management port.

8. The method according to claim 7, further comprising:
using a power controller to power on at least one of the circuit portions that is in the power-off mode in response to the power-on instruction received through the management port from a device in the management network.

9. The method according to claim 7, further comprising:
configuring the management port into the passive receiving mode when the circuit portions lack network traffic.

10. The method according to claim 7, further comprising:
configuring the management port into the passive receiving mode in response to a power-off instruction received from another network switch.

11. The method according to claim 7, wherein the power-on instruction is transmitted in a packet.

12. A network switch, comprising:
a plurality of circuit portions configured to at least one of receive, switch and transmit network traffic, at least some of the circuit portions of the network switch being configurable in a power-on mode and a power-off mode and to communicate with a terminal device;
a management port assigned as a member of a management network, the management port configured to:
  communicate with another switch in a network,
  transmit traffic load indications to the management network in response to a traffic polling request from other switches coupled to the network switch that is an edge switch via the management port of the management network when a transmitting portion of the management port is powered on, and
  receive power control instructions from the management network in a passive receiving mode when a receiving portion of the management port remains powered on and at least the transmitting portion remains powered off; and
a power controller configured to control at least one of the circuit portions that is in the power off-mode to enter the power-on mode in response to a power-on instruction received by the management port.

13. The network switch according to claim 12, wherein the power controller is configured to change the power modes of selected circuit portions among the circuit portions in response to the power control instructions received through the management port.

14. The network switch according to claim 12, wherein the power controller is configured to change a power mode of a selected circuit portion from the power-on mode to the power-off mode when there is no network traffic to the selected circuit portion, and to change the power mode of the selected circuit portion from the power-off mode to the power-on mode in response to the power-on instruction received by the management port.

15. The network switch according to claim 12, wherein the power controller is configured to change a power mode of a selected circuit portion from the power-on mode to the power-off mode in response to a power-off instruction from the management network received by the management port, and to change the power mode of the selected circuit portion from the power-off mode to the power-on mode in response to the power-on instruction from the management network received by the management port.

16. The network switch according to claim 12, wherein the power control instructions are included in packets directed to the management port of the network switch.

17. The network switch according to claim 12, wherein the management port is a port communicating with other switches in a network.

18. A network switch, comprising:
a plurality of circuit portions configured to at least one of receive, switch and transmit network traffic, at least some circuit portions of the network switch being configurable in a power-on mode and a power-off mode, at least one of the circuit portions configured to communicate with a terminal device; and
a management port assigned as a member of a management network, the management port configured to:
  communicate with another switch in a network,
  receive traffic polling requests from other switches coupled to the network switch that is an edge switch via the management port of the management network, and to transmit traffic load indications to the management network in response to the traffic polling request when a transmitting portion of the management port is powered on, and
  receive instructions from the management network in a passive receiving mode when a receiving portion of the management port remains powered on and at least the transmitting portion remains powered off until the management port receives a power-on instruction from the management network; and
a power controller configured to control at least one of the circuit portions that is in the power-off mode to enter the power-on mode in response to the power-on instruction received by the management port.

* * * * *